United States Patent [19]

Kurosaki

[11] 4,070,945
[45] Jan. 31, 1978

[54] SCREW GROMMET
[75] Inventor: Mutsuo Kurosaki, Moriguchi, Japan
[73] Assignee: Nifco Inc., Tokyo, Japan
[21] Appl. No.: 684,202
[22] Filed: May 7, 1976
[30] Foreign Application Priority Data
   May 7, 1975   Japan .............................. 50-60639[U]
[51] Int. Cl.² ............................................ F16B 13/04
[52] U.S. Cl. ............................................ 85/80; 85/82
[58] Field of Search .................................. 85/80–83;
                                                                151/41.75
[56] References Cited
   U.S. PATENT DOCUMENTS

| 2,788,047 | 4/1957 | Rapata | 85/80 |
| 3,136,350 | 6/1964 | Rapata | 85/80 |
| 3,200,694 | 8/1965 | Rapata | 85/82 |
| 3,342,098 | 9/1967 | Schuplin | 85/83 |
| 3,703,120 | 11/1972 | Van Buren | 85/83 |
| 3,756,116 | 9/1973 | Schuplin | 85/83 X |
| 3,830,134 | 8/1974 | Erickson | 85/83 X |

Primary Examiner—Ramon S. Britts
Assistant Examiner—Rodney H. Bonck
Attorney, Agent, or Firm—Robert W. Beart; J. R. Halvorsen

[57] ABSTRACT

Disclosed is a plastic screw grommet, comprising a flange head containing a through hole for insertion of a screw at the center thereof, a pair of insertion leg members perpendicularly extending downwardly from the undersurface of said flange head opposite each other with reference to said through hole and having engaging projections formed one each on the outer surfaces thereof, a pair of leaves adapted to avoid restraining the movement of said leg members and stretched one each to integrally connect the opposed edges of the leg members so as to form a substantially cylindrical enclosure in conjunction with the leg members, whereby the leading end of a screw driven through said flange head is wrapped in said cylindrical enclosure.

2 Claims, 7 Drawing Figures

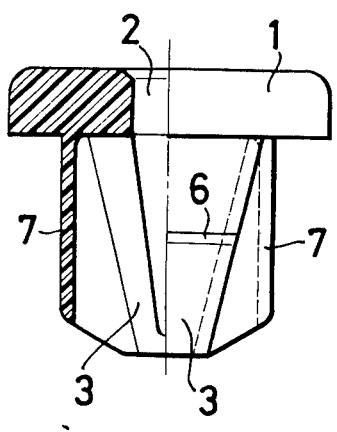
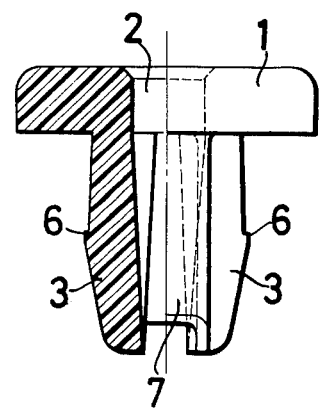
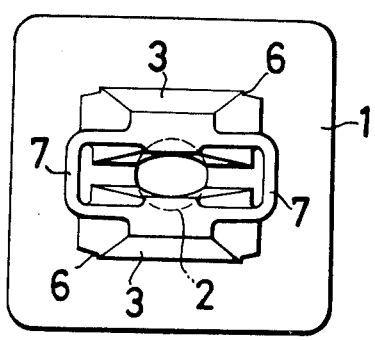
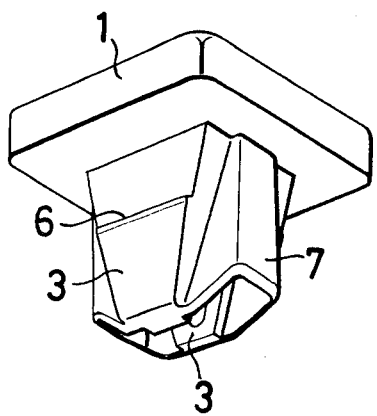

SCREW GROMMET

BACKGROUND OF THE INVENTION

This invention relates to a screw grommet of the type to be used such as when a given part is fastened with a screw to a metallic plate or plastic plate.

When a part is fastened with a screw to the body of an electric appliance, for example, the fastening is effected in some cases by direct use of a tapping screw. When the plate on which such fastening is made does not have enough thickness to retain the driven screw or when it is made of a plastic material too brittle to permit direct tapping of a screw, however, there is inevitably adopted a method which comprises boring a through hole in advance in the plate, attaching to said through hole a grommet and having a screw driven into position by virtue of said grommet.

For use in such cases, there have heretofore been proposed various kinds of grommets. Among them are included plastic grommets of the type, comprising a head member containing a through hole for insertion of a screw at the center thereof and a pair of leg members perpendicularly extending downwardly from the undersurface of said head member opposite each other with reference to said through hole, whereby desired fastening of a screw to a given plate is effected by inserting the leg members of the grommet through a perforation bored in advance in said plate and then driving the screw into said through hole and consequently causing the advancing screw to push said leg members outwardly to the extent of permitting the edge of said perforation to be embedded into the leg members. (Refer to U.S. Pat. Nos. 2,788,047 and 2,975,814, for example.)

The grommets of this type are simple in shape and are easily fastened to holder plates and, therefore, are extensively used as fasteners for smaller screws, particularly for the purpose of attaching parts to electrical appliances in most cases.

As is plain from the foregoing description, when the grommet of the principle just mentioned is used to fasten a screw in position, the act of driving the screw therein causes the leg members extending downwardly from the undersurface of the head member to be pushed apart and the divergence of the leg members causes the grommet and consequently the screw to be fastened onto the holder plate. After the screw has been driven home in this grommet, the leading tip of the screw exposes itself between the leg members.

For use on an electrical appliance, this grommet does not always prove to be completely advantageous, since an electrical wire inside this appliance may come into contact with the leading tip of the screw and cause electric current to flow to the part which has been fastened onto the appliance by use of the grommet.

An object of the present invention is to provide a plastic screw grommet adapted to wrap in the forward end of a screw driven therein and consequently prevent said end from coming into contact with an electric wire or other part incorporated in the path of electric current.

SUMMARY OF THE INVENTION

To accomplish the object described above according to the present invention, there is provided a plastic screw grommet which comprises a head member, a pair of opposed leg members perpendicularly extending downwardly from the undersurface of said head member and a pair of leaves thin and flexible enough to avoid restraining the movement of said leg members and stretched to connect integrally the opposed edges of said leg members so as to form a cylindrical enclosure in conjunction with the leg members, whereby the leading end of a screw being driven into the opening between the leg members is wrapped in said cylindrical enclosure. The otherwise possible direct contact of the screw with an electric wire or some other part incorporated in the path of electric current is completely precluded by having the driven screw wholly wrapped in an insulating plastic enclosure.

The other objects and other characteristics of the present invention will become apparent from the description to be given in further detail hereinafter with reference to the attached drawing.

BRIEF DESCRIPTION OF THE DRAWINGS

FIG. 1 is a partially sectioned front view of a typical screw grommet embodying the present invention.

FIG. 2 is a partially sectioned side view of the typical screw grommet of FIG. 1.

FIG. 3 is a bottom view of the screw grommet of FIG. 1.

FIG. 4 is a perspective view of the screw grommet of FIG. 1.

DESCRIPTION OF THE PREFERRED EMBODIMENTS

Figure 5:
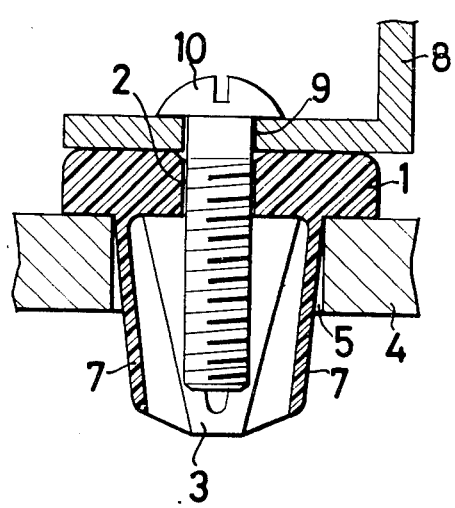
FIG. 5 is a sectional front view of the screw grommet in a state assumed while the screw grommet is in use.

The drawing depicts a typical screw grommet embodying the present invention. In the drawing, a flange head 1 contains a through hole 2 for insertion of a screw at the center thereof and a pair of leg members 3 are perpendicularly extended downwardly from the undersurface of said flange head 1 opposite each other with reference to said through hole 2.

Said leg members 3 are each in the shape of a plate and the lower portions thereof are slightly inclined inwardly so that the gap therebetween is substantially narrowed at the lower extremities. The two leg members have their wall thickness increased halfway their entire length so as to allow their outer surfaces to bulge out. On these bulges are formed engaging projections 6 adapted to be caught by the corresponding edges of a perforation 5 bored in a holder plate 4.

A pair of thin-walled leaves 7 are stretched to integrally connect the opposed edges of the two leg members 3 throughout the entire length of said leg members 3. These leaves 7 are formed in widths each greater than the gap which occurs between the two leg members 3 when said leg members are in their normal state, namely when the gap therebetween is narrowed at the lower extremities thereof as described above. The width of the leaves are so ample that they avoid restraining the movement of the leg members even when they are pushed apart by the gradual insertion of the screw therebetween. In the illustrated embodiment, the leaves are formed so that they expand outwardly at the center to ensure freedom of ample deformation.

Figure 6:
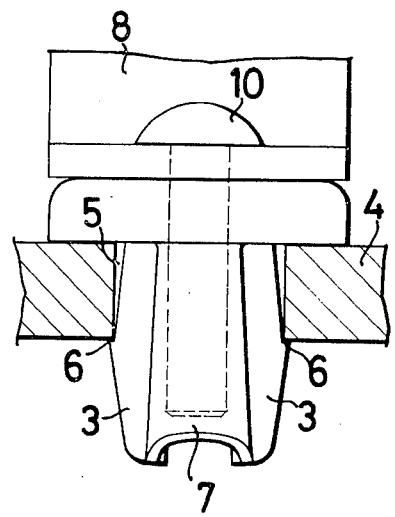
FIG. 6 is a side view of FIG. 5.
Figure 7:
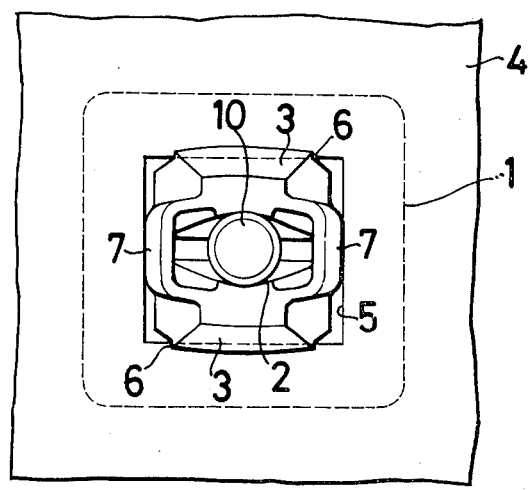
FIG. 7 is a bottom view of FIG. 5.

The screw grommet of the present invention having the construction described above is fabricated in a unitary form with a thermoplastic synthetic resin which combines tenacy and flexibility both in suitable degrees. Use of this screw grommet is accomplished, as illustrated in FIGS. 5-6, by first inserting said leg members 3 into the perforation 5 bored in advance in the holder plate 4 on which desired fastening of a given part is effected and, after the engaging projections 6 formed on the outer surfaces of said leg members have come into contact with the edges of said perforation, forcibly pushing the leg members and thereby causing said projections to advance past the lower surface of said holder plate and enabling engaging the projections to get caught by the edges of the perforation, with the result that the screw grommet is temporarily fastened to the holder plate. While the projections are advancing to ride over the edges of the perforation, the leg members 3 momentarily contract but resume their former shape by virtue of the resiliency of the material. Once the temporary fastening is obtained as described above, it never happens that said engaging projections 6 will be released from the edges and suffered to slip off. The temporary fastening of the screw grommet effected as indicated above is followed by the steps of applying a part 8 subjected to attachment to the upper face of the flange head 1 already abutted against one surface of the holder plate, inserting a setscrew 10 through a perforation 9 formed in advance in said part 8 into the through hole 2 in the flange head 1, driving said setscrew 10 from that position past the undersurface of said head into the gap between the leg members 3 extending downwardly from said undersurface for thereby causing the advancing screw to push the leg members apart and, at the same time, enabling the engaging projections already in contact with the edges of said perforation 5 to tighten their hold of said edges until the setscrew jams in position between the two leg members tightly enough to defy separation. This completes the final fastening of said part. In this case, the setscrew which is driven in as described above forces it way through the gap between the leg members and pushes the opposed leg members apart. Since the setscrew is always held inside the cylindrical enclosure formed by the leg members and the leaves 7 stretched to connect integrally the opposed edges of said leg members, it never happens that the setscrew will be exposed directly to view.

If the leg members are spread apart by the force of the advancing setscrew, the leading end of the setscrew has no possibility of coming into contact with an electric wire or a part incorporated in the path of electric current. Thus, the screw grommet of the present invention can be used with the utmost safety.

During the insertion of the setscrew in the grommet, since the leaves extending between the leg members have flexibility, they never impede the leg members from being expanded apart. The strength with which the fastening of a given part is accomplished by the screw grommet of this invention is not inferior in the least to that of the conventional grommets.

What is claimed is:

1. A one-piece plastic screw grommet for use in a non-circular apertured workpiece including a centrally apertured head adapted for accepting a screw therethrough, a pair of leg members extending downwardly from the underside of said head in spaced opposed relation, the inner opposed surfaces of said legs carrying concavities forming a tapered through bore co-axial with said aperture through the head, the lateral edges of each leg being axially tapered inwardly from said head toward their opposite free end, the outer surface of each said leg being tapered outwardly from its free end to a point intermediate its length to form shoulder means, a pair of generally flexible U-shaped web means having a pair of arms and a base with said web means having a thickness substantially less than the thickness of said legs, each web means extending from the underside of said head to adjacent the free end of said legs and with the arms of each web attached to the axially tapered adjacent lateral edges of the legs intermediate the inner and outer surfaces of said legs and having an increasing height from adjacent said head to said free end, whereby each said base of said pair of web means extending substantially parallel to one another and to the axis of said bore with the increased extent of said U-shaped web adjacent the free end of said legs thereby providing substantially unrestricted flexure of said legs when a screw is telescoped into said legs and causes this separation by contact with the tapered bore.

2. The screw grommet according to claim 1, wherein the leg members have a length such that the lower extremities thereof fall below the leading end of the screw extending through the flange head.

* * * * *